Figures 1, 2:
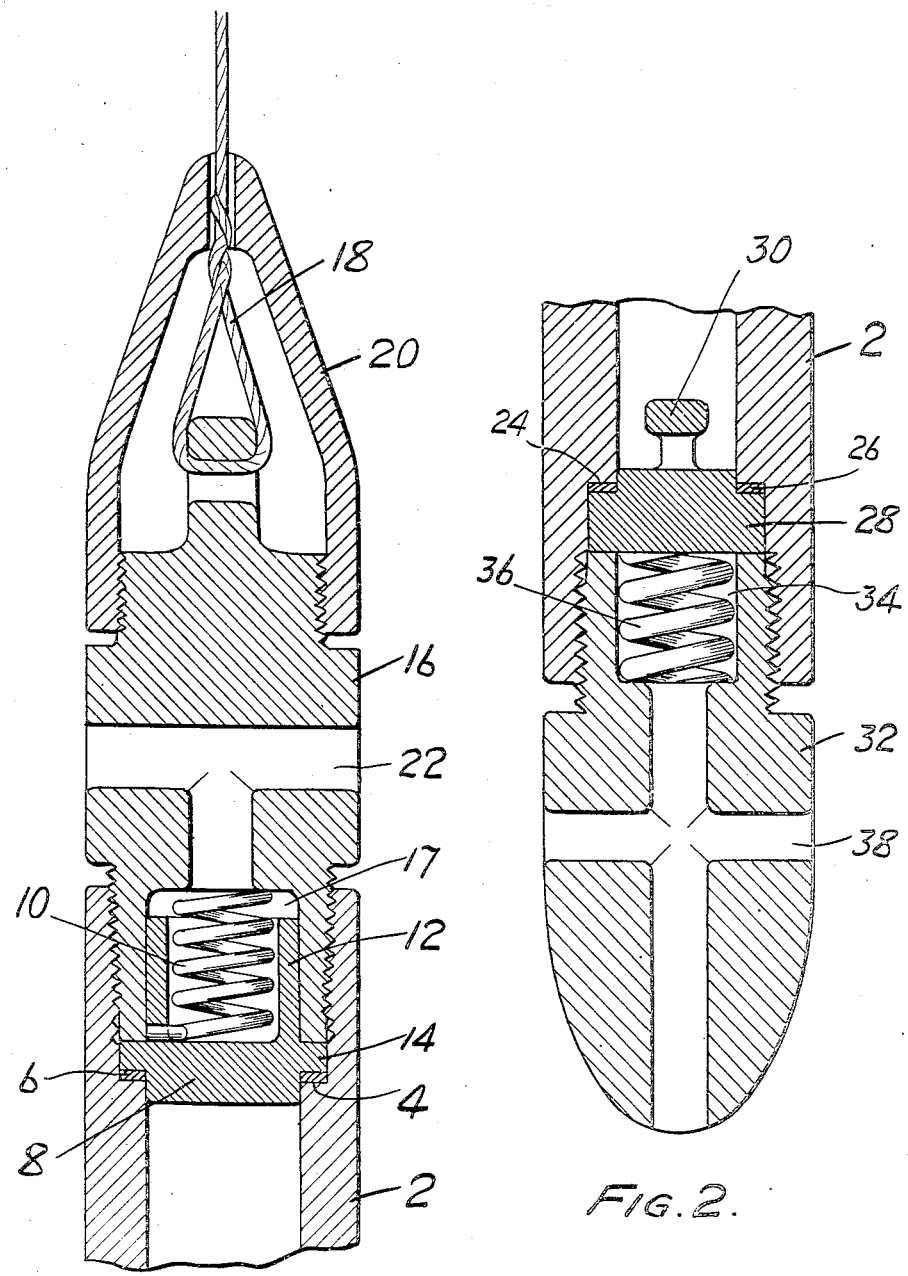

Feb. 20, 1940.  G. L. KOTHNY  2,190,716

HIGH PRESSURE CLOSURE

Filed May 16, 1939

WITNESS:

INVENTOR

Gottdank L. Kothny

BY

ATTORNEYS.

Patented Feb. 20, 1940

2,190,716

UNITED STATES PATENT OFFICE 2,190,716

HIGH PRESSURE CLOSURE

Gottdank L. Kothny, Strafford, Pa., assignor to Sperry-Sun Well Surveying Company, Philadelphia, Pa., a corporation of Pennsylvania Application May 16, 1939, Serial No. 273,839

3 Claims. (Cl. 166—1)

This invention relates to a closure means for a casing adapted to be subjected to high external fluid pressures. Particularly the invention relates to a closure adapted for a protective casing for housing a well surveying instrument to be lowered within a mud filled bore hole.

In the surveying of bore holes there are lowered thereinto on wire lines or drill stems, or by free dropping, delicate measuring instruments responsive to inclination and sometimes direction of inclination of the hole. These instruments must be enclosed within protective casings to prevent influx of the mud which is used to fill such hole to prevent caving of its walls. Since these holes at the present time are drilled quite commonly to depths exceeding a mile, and since the mud used for filling them has generally a specific gravity considerably exceeding that of water, it will be apparent that the well surveying instrument casings are subjected to pressures of enormous amounts. In general, the instruments, particularly if they are of the single shot variety, are adjusted to make their records after the lapse of a predetermined time. Since they must be set at the surface, and since operation of the surveying instrument generally entails stopping of a drilling operation, the running of a well surveying instrument is generally desirably performed in a minimum amount of time. Accordingly, it is important that a closure for the casing should be readily opened and closed in order that the time for effecting closure may be of a definite amount and so can be taken into account in setting the time of operation. Despite the fact that the closure must be made readily removable, it must be capable of withstanding the enormous mud pressures which are encountered. It is the object of the present invention to provide an improved closure for such a protective casing which may be readily opened and closed and which is of such nature as to become tighter with increase of applied pressure, thus serving to more effectively prevent leakage which would destroy a well surveying instrument located in the casing.

The above object and more general objects relating to details will become apparent from the following description, read in conjunction with the accompanying drawing, in which:

Figure 1 illustrates in fragmentary longitudinal section a closure adapted for a well surveying instrument casing and illustrated as used at the upper end of said casing; and Figure 2 is a similar section showing a modified form of closure illustrated at the lower end of such casing.

The protective casing is illustrated at 2 and consists of a strong thick-walled tube which may be made of steel in the event that it is designed for a non-magnetic instrument or of a non-ferrous alloy in the event that it is designed for a magnetic instrument. This casing 2 is provided with a shoulder 4 on which is adapted to seat an annular gasket 6 made of suitable material to withstand high compression and adapted to pack against high pressures. Such gasket may be of soft metal such as lead, or of other materials conventionally used for such purposes.

Above the gasket 6 is a pressure element 8 arranged with a central portion adapted to enter and closely fit the bore of the casing 2 and provided with a flange portion arranged to compress the gasket 6. The member 8 is provided with a sleeve portion indicated at 12 adapted to house a strong spring 10, which is preferably fixed thereto to prevent relative turning and provide the element 8 and the spring as a single unit for removal purposes.

Adapted to be threaded in the upper end of the casing 2 and to fit over the sleeve 12 is a bored cap member 16. To this as indicated at 18, there may be secured a supporting cable, the connection being covered by a protective cap 20. The chamber 17 which houses the spring 10 has free communication with the exterior of the instrument through openings 22 into which mud may enter.

In closing the casing, the gasket and element 8 are located in position. The member 16 is then threaded into the upper end of the casing and before engaging the flanges 14 of element 8 will strongly compress the spring 10 so that it will exert a high pressure upon the gasket 6. The member 16 is threaded inwardly, however, until its end exerts a high pressure on the element 8 so that the gasket is initially under a quite high compression. As the casing is lowered into the mud of the bore hole, it exerts a pressure on the upper surface of the element 8, forcing it more tightly toward the shoulder 4 to compress the gasket. The purpose of the spring 10 is to insure a continuous heavy mechanical pressure upon the gasket of a uniform type which might not be attained by the use of the member 16 alone in its action upon the flange 14. By the arrangement just described, a uniform pressure on the gasket results which increases in amount with the increase in mud pressure as the instrument descends in a hole.

A substantially identical type of closure may be applied to the lower end of the casing. For purposes of illustration, however, a somewhat different type of closure is illustrated in Figure 2. This comprises the seat 24 arranged to receive the gasket 26, which is pressed against the seat by the element 28. This element 28 may carry a key member 30 adapted to be engaged in the lower end of a well surveying instrument to hold it in fixed position inside the protective casing. The lower nose member 32 is adapted to be threaded into the lower end of the casing and is provided with a hollow 34 arranged to receive a strong spring 36. This spring chamber is in communication with the fluid outside the instrument through the passages indicated at 38. This closure of Figure 2 functions in the same fashion as that illustrated in Figure 1 and is essentially self-packing against high mud pressures.

It will be clear that various alternative arrangements may be adopted within the scope of the present invention.

What I claim and desire to protect by Letters Patent is:

1. In combination with a casing adapted to be subjected to high external pressures, closure means comprising a gasket arranged to be seated about an opening in said casing, a pressure element arranged to rest on said gasket, a member secured to the casing and arranged to press upon said element to compress the gasket on its seat, and a spring reacting between the member and element to force the member additionally to compress the gasket.

2. In combination with a casing adapted to be subjected to high external pressures, closure means comprising a gasket arranged to be seated about an opening in said casing, a pressure element arranged to rest on said gasket, a member secured to the casing and arranged to rest on said gasket, a member secured to the casing and arranged to press upon said element to compress the gasket on its seat, and a spring reacting between the member and element to force the member additionally to compress the gasket, the surface of said element opposite the gasket being freely exposed to external pressures exerted upon the casing.

3. In combination with a casing adapted to be subjected to high external pressures, closure means comprising a gasket arranged to be seated about an opening in said casing, a pressure element arranged to rest on said gasket, and a member secured to the casing and arranged to press upon said element to compress the gasket on its seat, the surface of said element opposite the gasket being freely exposed to external pressures exerted upon the casing.

GOTTDANK L. KOTHNY.